United States Patent
Van De Sluis et al.

(10) Patent No.: US 12,402,226 B2
(45) Date of Patent: Aug. 26, 2025

(54) SELECTING A SENSOR DATA PROCESSING METHOD IN ACCORDANCE WITH A TYPE OF A LIGHTING DEVICE

(71) Applicant: SIGNIFY HOLDING B.V., Eindhoven (NL)

(72) Inventors: Bartel Marinus Van De Sluis, Eindhoven (NL); Bernardus Johannes Pronk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 279 days.

(21) Appl. No.: 17/925,044

(22) PCT Filed: Apr. 29, 2021

(86) PCT No.: PCT/EP2021/061355
§ 371 (c)(1),
(2) Date: Nov. 14, 2022

(87) PCT Pub. No.: WO2021/228575
PCT Pub. Date: Nov. 18, 2021

(65) Prior Publication Data
US 2023/0189419 A1     Jun. 15, 2023

(30) Foreign Application Priority Data
May 14, 2020   (EP) ..................... 20174677

(51) Int. Cl.
*H05B 47/135*  (2020.01)
*H05B 47/17*   (2020.01)
*H05B 47/175*  (2020.01)

(52) U.S. Cl.
CPC ........... *H05B 47/135* (2020.01); *H05B 47/17* (2020.01); *H05B 47/175* (2020.01)

(58) Field of Classification Search
CPC .... H05B 47/19; H05B 45/382; H05B 47/105; H05B 45/3725; H05B 47/135;
(Continued)

(56) References Cited

U.S. PATENT DOCUMENTS

2016/0057838 A1* 2/2016 Maros ................... H05B 47/19
                                                           315/291
2016/0192458 A1  6/2016 Keith
(Continued)

FOREIGN PATENT DOCUMENTS

JP          3192121 U      7/2014
JP       2018139217 A      9/2018
(Continued)

*Primary Examiner* — Renan Luque

(57) ABSTRACT

A sensor module (1) for insertion or integration into a lighting device comprises memory (7), at least one sensor (9), at least one output interface (4), and at least one processor (5) configured to obtain lighting device information when the sensor module is inserted or integrated into the lighting device and store the lighting device information in the memory. The lighting device information is indicative of a type of the lighting device. The at least one processor is further configured to select a processing method in accordance with the type of the lighting device, obtain sensor data from the at least one sensor, apply the selected processing method to the sensor data to produce sensing results, and output the sensing results via the at least one output interface.

15 Claims, 3 Drawing Sheets

(58) Field of Classification Search
CPC .... H05B 47/17; H05B 47/175; H05B 47/199; H02J 50/10; H01F 38/14; Y02B 20/40
See application file for complete search history.

(56) References Cited

U.S. PATENT DOCUMENTS

| | | |
|---|---|---|
| 2017/0265268 A1 | 9/2017 | Couch et al. |
| 2018/0249539 A1* | 8/2018 | Saccavini ............... H02J 50/90 |
| 2018/0317302 A1* | 11/2018 | Setomoto ......... G10K 11/17823 |
| 2019/0014642 A1 | 1/2019 | Chen |
| 2019/0200434 A1 | 6/2019 | Chen |
| 2019/0354148 A1 | 11/2019 | Delano et al. |
| 2020/0329543 A1* | 10/2020 | Shi ......................... H05B 47/19 |

FOREIGN PATENT DOCUMENTS

| | | |
|---|---|---|
| WO | 2009090601 A1 | 7/2009 |
| WO | 2017153637 A1 | 9/2017 |

* cited by examiner

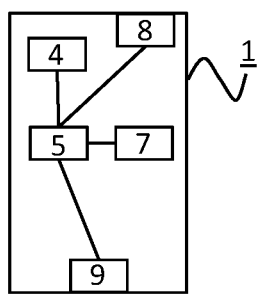
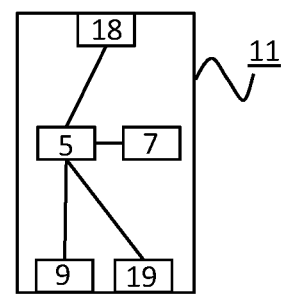
Fig. 1
Fig. 2
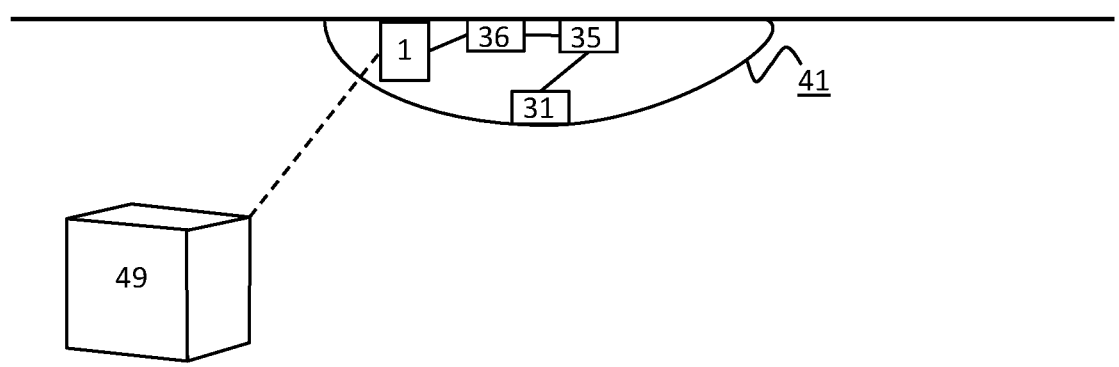
Fig. 3
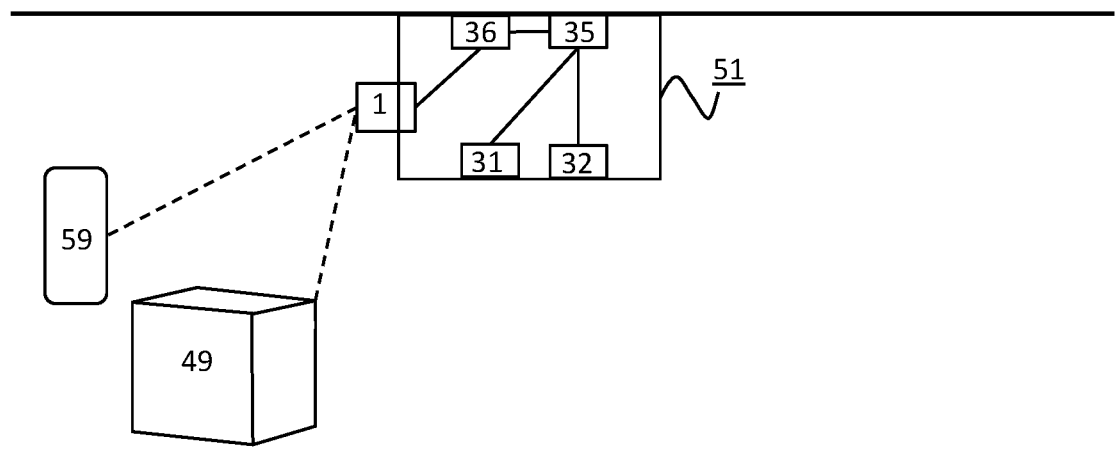
Fig. 4

SELECTING A SENSOR DATA PROCESSING METHOD IN ACCORDANCE WITH A TYPE OF A LIGHTING DEVICE

CROSS-REFERENCE TO PRIOR APPLICATIONS

This application is the U.S. National Phase application under 35 U.S.C. § 371 of International Application No. PCT/EP2021/061355, filed on Apr. 29, 2021, which claims the benefit of European Patent application Ser. No. 20/174,677.3, filed on May 14, 2020. These applications are hereby incorporated by reference herein.

FIELD OF THE INVENTION

The invention relates to a sensor module for insertion or integration into a lighting device and to a lighting device comprising such a sensor module.

The invention further relates to a method of producing sensing results.

The invention also relates to a computer program product enabling a computer system to perform such a method.

BACKGROUND OF THE INVENTION

Sensors are important components when making homes, offices and other buildings smarter. For example, a presence sensor may be used to automatically switch on and off lights and a light sensor may be used to automatically open and close blinds. It is known to integrate sensors into a lighting device. For example, WO 2009/090601 A1 discloses integrating a temperature sensor and a color sensor in a luminaire in order to detect properties of the light elements of the luminaire and calculate a light correction necessary to achieve a certain setpoint.

US 2019/0014642 A1 discloses a wall lamp that includes a lamp body and a control module. The control module has a control unit and an operating parameter adjusting element respectively disposed on two different sides of the control module. A cover is designed to partially cover the control module. The control module is rotatable against a central axis respectively to a first angle position and a second angle position. When the control module is rotated to the first angle position, the operating parameter adjusting element is hidden behind in the back and the wall lamp is enabled to perform an illumination function. When the control module is rotated to the second angle position, the operating parameter adjusting element is exposed to being adjustable.

However, integration of sensors into luminaires is not just beneficial for controlling the lighting device itself. The lighting infrastructure is uniquely positioned to serve as a carrier for the Internet of Things roll-out in buildings and luminaires provide space and power to host a variety of sensors. A drawback of integrating sensors in luminaires is that the sensors need to be calibrated for the specific luminaire they are integrated in.

SUMMARY OF THE INVENTION

It is a first object of the invention to provide a sensor module, which can be integrated or inserted into a broad range of lighting devices.

It is a second object of the invention to provide a method, which allows a sensor module to be integrated or inserted into a broad range of lighting devices.

In a first aspect of the invention, a sensor module for insertion or integration into a lighting device comprises a memory configured to store processing methods associated with different types of lighting devices, at least one sensor, at least one output interface, and at least one processor configured to obtain lighting device information when said sensor module is inserted or integrated into said lighting device, said lighting device information being indicative of a type of said lighting device, store said lighting device information in said memory, select, from said processing methods stored in said memory, a processing method in accordance with said type of said lighting device, obtain sensor data from said at least one sensor, apply said selected processing method to said sensor data to produce sensing results, and output said sensing results via said at least one output interface.

By providing a sensor module for insertion or integration into a lighting which selects a processing method in accordance with the type of the lighting device, the sensor module may be integrated or inserted into a broad range of lighting devices while still performing optimally. For example, the lighting device could provide its type or specifics to the sensor module based on which the sensor module could adjust the sensor processing. The sensor module may either be integrated during the production process or may be inserted into the lighting device at a later stage, for instance, by attaching the sensor module to a connector and/or placing it at a docking element of the lighting device. Such an attachment means of the lighting device may provide mechanical support, electric power and a data connection to the sensor module.

Said type of said lighting device may be indicative of a property of said lighting device which affects propagation of a signal received by said at least one sensor through said lighting device and/or through said lighting device's environment and said at least one processor may be configured to select said processing method based on said property. For example, said type of lighting device may be indicative of a lay-out, a form factor, sound reflecting/absorbing characteristics, materials, sensor integration and/or construction of said lighting device.

Different luminaire types each have unique physical characteristics which have an influence on the received sensor signals. For instance, the specific lay-out, form factor and materials of a luminaire have an influence on the temperature as measured by a thermal sensor such that specific measurement compensations may be needed in order to assess the environmental temperature.

In a similar way, the sound signal as detected by a microphone could be influenced by the sound reflecting/absorbing characteristics of the luminaire. Field characteristics, signal strength and directionality of detection devices like microwave sensors may be influenced by the material choices, sensor integration and construction of the luminaire. When the lighting device comprises a diffuser, it typically makes a difference whether the sensor is in front of or behind the diffuser.

Said type may describe a surface on which said lighting device should be mounted or placed, e.g. on a ceiling, in a recess in a system ceiling, on a wall or on a floor, and/or comprises a model identifier (e.g. a model name like "Philips Hue Struana", a model number like 915005493901 or a serial number) and/or a model group identifier (e.g. "Philips Living Colors") and said at least one processor may be configured to select said processing method based on said surface, said model identifier and/or said model group identifier.

Said at least one processor may be configured to select a first processing method when said type of said lighting device has a first value and a second processing method when said type of said lighting device has a second value. For example, said first processing method and said second processing method may use different parameter (e.g. threshold) values, different algorithms, and/or different parts of said sensor data. Said different parts of said sensor data are obtained from different sensors.

Said at least one sensor may comprise a light sensor, a temperature sensor, an acoustic sensor, an infrared sensor, a motion sensor, accelerometer, gyroscope, magnetometer, and/or a microwave sensor. For example, when the sensor module comprises an accelerometer, a gyroscope, and/or a magnetometer, a processing method may be selected (based on the lighting device type) which determines an orientation of the lighting device. The orientation of the lighting device may be determined by applying the selected processing method to the accelerometer, gyroscope, and/or magnetometer sensor data if the sensor module can only be inserted or integrated into the lighting device in one orientation.

Said at least one processor may be configured to obtain said lighting device information from said lighting device, from a user device or from a server. Thus, the lighting device information may be shared directly from the lighting device to the sensor module or from another device, such as a server containing installation and commissioning information, to the sensor module.

Said at least one processor may be configured to obtain further sensor data from said at least one sensor in a learning phase, compare said further sensor data with reference data and determine said lighting device information based on said comparison. Thus, the lighting device information may not only be received, e.g. automatically from the lighting device upon connecting or commissioning the lighting device but may additionally or alternatively be learned based on the captured sensor data (during an initial learning phase). The latter may allow the influences of the integration of the luminaire in a building (like type of ceiling, including material, isolation, airflow) to be taken into account.

Said at least one processor may be configured to receive further information and select said processing method further based on said further information, said further information comprising user input with regard to sensing requirements, information about said lighting device's environment and/or information about a space in which said lighting device has been installed. For example, the lighting device may also share commissioning/configuration specifics indicating the room or application type, or the lighting device position in the room (e.g. near a window, or concrete wall), such that the sensor module could select a processing method optimized for this room, application type or position. Such information may be also shared by a server containing building, installation and/or commissioning information.

In a second aspect of the invention, a method of producing sensing results comprises obtaining lighting device information in a sensor module when said sensor module is inserted or integrated into a lighting device, said lighting device information being indicative of a type of said lighting device, storing said lighting device information in a memory of said sensor module, said memory storing processing methods associated with different types of lighting devices, selecting, from said processing methods stored in said memory, a processing method in accordance with said type of said lighting device, obtaining sensor data from at least one sensor comprised in said sensor module, applying said selected processing method to said sensor data to produce said sensing results, and outputting said sensing results. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for producing sensing results.

The executable operations comprise obtaining lighting device information in a sensor module when said sensor module is inserted or integrated into a lighting device, said lighting device information being indicative of a type of said lighting device, storing said lighting device information in a memory of said sensor module, selecting a processing method in accordance with said type of said lighting device, obtaining sensor data from at least one sensor comprised in said sensor module, applying said selected processing method to said sensor data to produce said sensing results, and outputting said sensing results.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which:

FIG. 1 is a block diagram of a first embodiment of the sensor module;

FIG. 2 is a block diagram of a second embodiment of the sensor module;

FIG. 3 is a block diagram of a first embodiment of the lighting device;

FIG. 4 is a block diagram of a second embodiment of the lighting device;

Corresponding elements in the drawings are denoted by the same reference numeral.

DETAILED DESCRIPTION OF THE EMBODIMENTS

Figure 5:
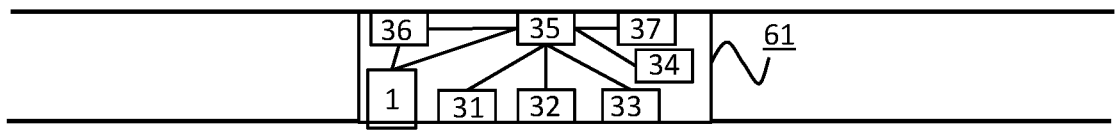
FIG. 5 is a block diagram of a third embodiment of the lighting device.

FIG. 1 shows a first embodiment of a sensor module for insertion or integration into a lighting device: a sensor module 1. The sensor module 1 comprises a transceiver 4, a processor 5, memory 7, a power connector 8 and a sensor 9. In the embodiment of FIG. 1, the sensor module 1 only comprises one sensor. In an alternative embodiment, the sensor module comprises multiple sensors. The sensor 9 may be a light sensor, a temperature sensor, an acoustic sensor, an infrared sensor, a motion sensor, accelerometer, gyroscope, magnetometer, or a microwave sensor, for example.

The processor 5 is configured to obtain lighting device information when the sensor module 1 is inserted or integrated into a lighting device and store the lighting device information in the memory 7. The lighting device information is indicative of a type of the lighting device. The processor 5 is further configured to select a processing method from the memory, which may be configured to store processing methods associated with different types of lighting devices, in accordance with/associated with the type of the lighting device. This may range from a simple adjustment of a parameterized algorithm to determining and downloading the required sensor processing algorithms from a server.

For temperature sensors, the processing method may include the parameters and correction curves necessary to correct the temperature sensor readings based on the light output level setting (and its evolution over time) for the specific lighting device type. For acoustic sensors, the processing method may include a simple sensitivity correction factor over the entire frequency spectrum or correction curves that take into account any frequency dependencies and resonances in the luminaire to correct the attenuation (or amplification) of the signal caused by (e.g. reflection of the sound in) the housing of the specific lighting device type.

For microwave and infrared sensors, the processing method may include a detection threshold to correct for the differences in sensitivity and field directionality caused by different lighting devices. Furthermore, certain parts of the available sensor data may be disregarded according to the lighting device type, e.g. by (de-)activating specific sensors. As a first example, in luminaires with a compact size, ambient temperature sensing is typically unreliable, and the temperature sensor may therefore be deactivated. As a second example, in certain luminaires, the housing prevents the microwave sensor from working and the microwave sensor may be deactivated for these luminaires.

The processor 5 is further configured to obtain sensor data, typically raw sensor data, from the sensor 9, apply the selected processing method to the sensor data to produce sensing results, and output the sensing results. In the embodiment of FIG. 1, the sensing results are output via (e.g. RF) transceiver 4.

FIG. 2 shows a second embodiment of a sensor module for insertion or integration into a lighting device: a sensor module 11. In comparison with the sensor module 1 of FIG. 1, the sensor module 11 comprise a second sensor 19, does not comprise a transceiver 4, and comprises a power and data connector 18 instead of power connector 8. In the embodiment of FIG. 2, the sensing results are output via the power and data connector 18 instead of via transceiver 4.

In the embodiments of FIGS. 1 and 2, the sensor module comprises a power connector for receiving power from the mains power via the lighting device. In an alternative embodiment, the sensor module comprises a battery. In a variant on the second embodiment of FIG. 2, a battery is added to the sensor module 11 and the power and data connector 18 is replaced with a data connector.

In the embodiment of the sensor modules 1 and 11 shown in FIGS. 1 and 2, the sensor modules comprise one processor 5. In an alternative embodiment, the sensor modules comprise multiple processors. The processor 5 of the sensor modules 1 and 11 may be a general-purpose processor or an application-specific processor. The memory 7 may comprise one or more memory units. The memory 7 may comprise solid-state memory, for example.

The transceiver 4 of sensor module 1 may use one or more wireless communication technologies. e.g. Zigbee, Bluetooth, or Wi-Fi, for communicating with one or more other devices. In an alternative embodiment, multiple receivers and/or multiple transmitters are used instead of a single receiver and a single transmitter. In the embodiment shown in FIG. 1, a receiver and a transmitter are combined into the transceiver 4. In an alternative embodiment, a separate receiver and a separate transmitter are used.

The sensor modules 1 and 11 may comprise other components typical for a sensor module. The invention may be implemented using a computer program running on one or more processors.

FIG. 3 shows a first embodiment of a lighting device in which sensor module 1 of FIG. 1 has been integrated: a lighting device 41. The lighting device 41 has been mounted on a ceiling. The lighting device 41 comprises a processor 35, a power unit 36, and a light element 31. The power unit 36 receives power from the mains power and provides this power to the sensor module 1 and to other components of the lighting device 41. In the embodiment of FIG. 3, the sensor module 1 has been integrated into the lighting device 41 and cannot be removed without removing the cover/diffuser of lighting device 41, if at all.

In the example of FIG. 3, the sensor module 1 obtains the lighting device information from a server 49 and outputs the sensing results to the server 49. The sensor module 1 may communicate directly with the server 49, e.g. using Bluetooth or WiFi Direct technology, or via another device, e.g. a wireless LAN access point.

FIG. 4 shows a second embodiment of a lighting device in which sensor module 1 of FIG. 1 has been inserted: a lighting device 51. The lighting device 51 has also been mounted on a ceiling. The lighting device 51 comprises a processor 35, a power unit 36, and light elements 31 and 32. In the embodiment of FIG. 4, the sensor module 1 has been inserted into the lighting device 51 and can be removed without removing any cover.

In the example of FIG. 4, the sensor module 1 obtains the lighting device information from a user device 59, e.g. a mobile phone, and outputs the sensing results to the server 49. The sensor module 1 may communicate directly with the user device 59, e.g. using Bluetooth or WiFi Direct technology, or via another device, e.g. a wireless LAN access point.

FIG. 5 shows a third embodiment of a lighting device in which sensor module 1 of FIG. 1 has been inserted: a lighting device 61. The lighting device 61 has been installed in a recess of a system ceiling. The lighting device 61 comprises a transceiver 34, a processor 35, a power unit 36, memory 37, and light elements 31-33. In the embodiment of FIG. 5, the sensor module 1 has been inserted into the lighting device 61 and can be removed without removing any cover.

In the example of FIG. 5, the sensor module 1 obtains the lighting device information from the lighting device 61, which stores this information in memory 37, and outputs the sensing results to the lighting device 61. Then, the lighting device 61 may use transceiver 34 to transmit the sensing results to another device. A user device, e.g. the user device 59 of FIG. 4, may also be able to communicate with the lighting device 61, e.g. to turn the light elements on or off or to control the light setting, e.g. color and/or light output level.

In the embodiment of FIG. 1, the sensor module 1 is capable of obtaining the lighting device information from a user device, from a server, or from the lighting device in which it has been inserted or integrated. From which device the lighting device information is obtained may be configured in the sensor module before or while commissioning the lighting device, for example. In an alternative embodiment, the sensor module is only capable of obtaining the lighting device information from one or two of these devices.

In the embodiments of FIGS. 1 and 2, the sensor module relies completely on the information received from another device to determine the lighting device information. In an alternative embodiment, the processor of the sensor module is configured to obtain further sensor data from the sensor(s) in a learning phase, compare the further sensor data with reference data and determine the lighting device information based on the comparison.

In the embodiments of the lighting devices 41, 51 and 61 shown in FIGS. 3-5, the lighting devices comprises one processor 35. In an alternative embodiment, the lighting devices comprise multiple processors. The processor 35 of the lighting devices 41, 51 and 61 may be a general-purpose processor or an application-specific processor. The light elements 31-33 may be, for example, LEDs, e.g. direct emitting or phosphor converted LEDs. The memory 37 may comprise one or more memory units. The memory 37 may comprise solid-state memory, for example.

The transceiver 34 of lighting device 61 may use one or more wireless communication technologies. e.g. Zigbee, Bluetooth, or Wi-Fi, for communicating with one or more other devices. In an alternative embodiment, multiple receivers and/or multiple transmitters are used instead of a single receiver and a single transmitter. In the embodiment shown in FIG. 5, a receiver and a transmitter are combined into the transceiver 34. In an alternative embodiment, a separate receiver and a separate transmitter are used.

The lighting devices 41, 51 and 61 may comprise other components typical for a lighting device. The invention may be implemented using a computer program running on one or more processors.

Figure 6:
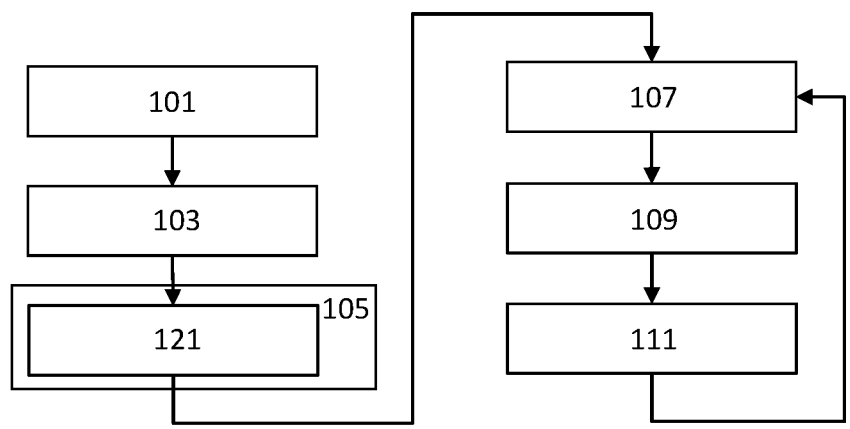
FIG. 6 is a flow diagram of a first embodiment of the method.

A first embodiment of a method of producing sensing results is shown in FIG. 6. A step 101 comprises obtaining lighting device information in a sensor module when the sensor module is inserted or integrated into a lighting device. The lighting device information is indicative of a type of the lighting device and typically indicative of a property of the lighting device which affects propagation of a signal received by the at least one sensor through the lighting device and/or through the lighting device's environment.

For example, step 101 may be performed as soon as the sensor module is attached to and connected with the lighting device. At the moment that the sensor device is being attached to and connected with the lighting device, a handshake may take place, whereby the lighting device detects the presence of the sensor module and informs the sensor module about the lighting device type and specifics.

Alternatively, the user explicitly specifies the type and purpose of the lighting device, for instance, using an app on a user device, e.g. a mobile device, which can be used to configure the sensor module. Alternatively, the sensor module receives the lighting device information over a network from a (central) server storing the lighting installation and commissioning information. If the sensor module does not receive explicit input about the lighting device, it may be able to enter a learning phase during which captured sensor data is analyzed (optionally compared to local or remotely stored reference data) in order to determine the lighting device information, e.g. the lighting device type.

Besides the lighting device information, also specifics of the room, surroundings and area purpose may be communicated by the lighting system or lighting device to the sensor module. In this way, the sensor module may optimize its sensor processing to this input. For instance, if the sensor module knows it is in an office, it might try to track desk occupancy and monitor noise levels, whereas if the sensor module is positioned at the entrance of a retail environment, the sensor module might assess the number of people entering and leaving the store.

A step 103 comprises storing the lighting device information in a memory of the sensor module. A step 105 comprises selecting a processing method in accordance with the type of the lighting device, as determined in step 101 and stored in step 103, and thus typically based on the property. A first processing method is selected when the type of the lighting device has a first value and a second processing method is selected when the type of the lighting device has a second value.

If the type describes a surface on which the lighting device should be mounted or placed, comprises a model identifier, and/or comprises a model group identifier, step 105 comprises selecting the processing method based on the surface, the model identifier and/or the model group identifier. The lighting device information is typically retrieved from the memory as part of step 105 or in a separate step performed between step 103 and 105 (not shown).

In the embodiment of FIG. 6, step 105 is implemented by a step 121. Step 121 comprises selecting a first parameter value when the type of the lighting device has a first value and selecting a second parameter value when the type of the lighting device has a second value.

A step 107 comprises obtaining sensor data, e.g. raw sensor data, from at least one sensor comprised in the sensor module. A step 109 comprises applying the selected processing method to the sensor data to produce the sensing results. In step 109, the parameter value selected in step 121 is applied to the sensor data. If the selected parameter value comprises a threshold value, this threshold value is applied to the sensor data. A step 111 comprises outputting the sensing results.

Figure 7:
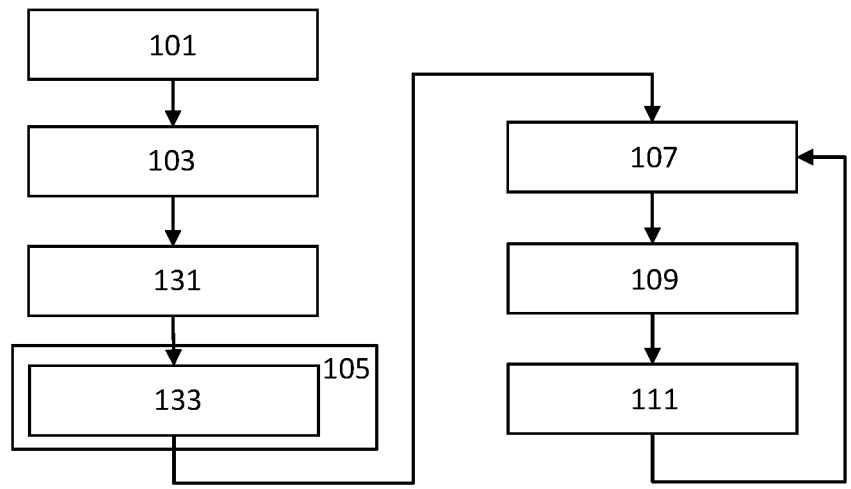
FIG. 7 is a flow diagram of a second embodiment of the method.

A second embodiment of a method of producing sensing results is shown in FIG. 7. In this second embodiment, compared to the first embodiment, a step 131 is performed between steps 103 and 105. Step 131 comprises receiving further information. The further information comprises user input with regard to sensing requirements, information about the lighting device's environment and/or information about a space in which the lighting device has been installed.

For example, when the user explicitly specifies the type and purpose of the lighting device, for instance, using an app on a user device, the user may additionally provide explicit input with regard to sensing requirements. For instance, a user may (de-)select sensing options from a pre-defined menu (e.g. presence sensing, activity detection, acoustic scene analysis, voice control, ambient light conditions, temperature, and/or air quality).

Moreover, in the embodiment of FIG. 7, step 105 is implemented by a step 133. Step 133 comprises selecting a first algorithm when the type of the lighting device has a first value, selecting a second algorithm when the type of the lighting device has a second value and the further information has a first value and selecting a third algorithm when the type of the lighting device has the second value and the further information has a second value.

Figure 8:
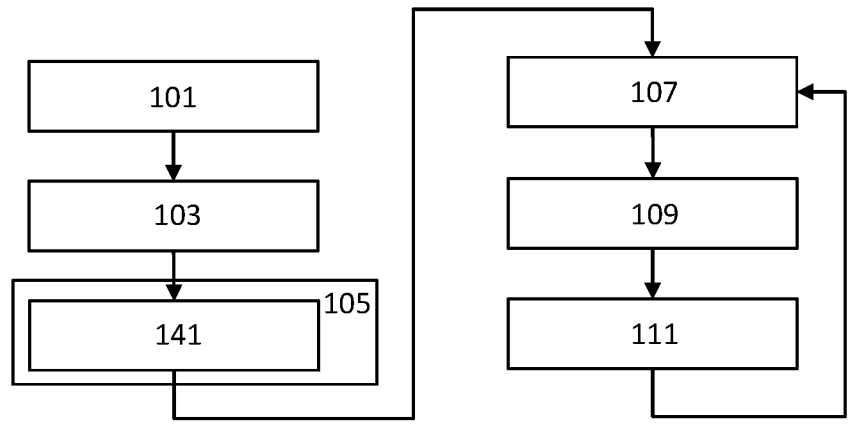
FIG. 8 is a flow diagram of a third embodiment of the method.

A third embodiment of a method of producing sensing results is shown in FIG. 8. In the embodiment of FIG. 8, the sensor module comprises a plurality of sensors and step 105 is implemented by a step 141. Step 141 comprises selecting a first part of the obtained sensor data when the type of the lighting device has a first value and selecting a second part of the obtained sensor data when the type of the lighting device has a second value.

The first and second parts are obtained from different sets of sensors. For example, the first part is obtained from sensor A and the second part is obtained from sensor B or the first part is obtained from sensors A and C and the second part is obtained from sensors B and C. The sensor module may comprise a light sensor, a temperature sensor, an acoustic sensor, an infrared sensor, a motion sensor, accelerometer, gyroscope, magnetometer, and/or a microwave sensor, for example.

The embodiments of FIGS. 6 to 8 differ from each other in multiple aspects, i.e. multiple steps have been added or replaced. In variations on these embodiments, only a subset of these steps is added or replaced and/or one or more steps is omitted. As a first example, step 131 may be omitted from the embodiment of FIG. 7 and/or added to the embodiments of FIGS. 6 and/or 8. As a second example, multiple of steps 121, 133 and 141 may be combined.

Figure 9:
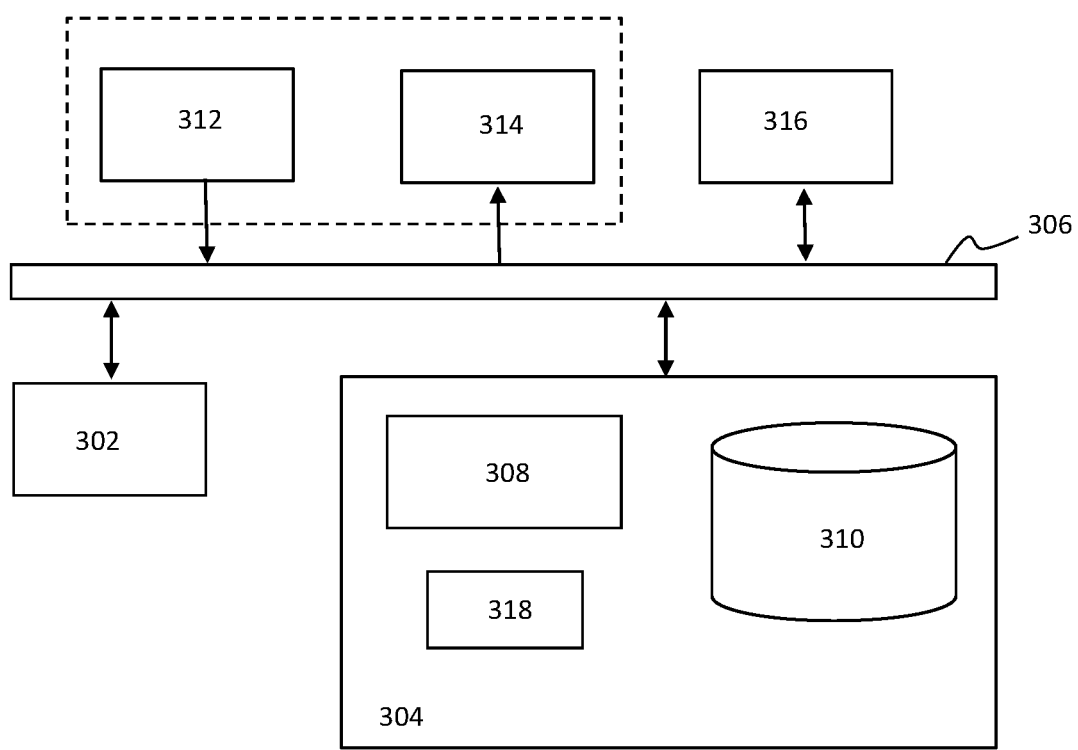
FIG. 9 is a block diagram of an exemplary data processing system for performing the method of the invention.

FIG. 9 depicts a block diagram illustrating an exemplary data processing system that may perform the method as described with reference to FIGS. 6 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 9 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A sensor module for insertion or integration into a lighting device, said sensor module comprising:
   a memory configured to store processing methods associated with different types of lighting devices;
   at least one sensor;
   at least one output interface; and
   at least one processor configured to:
     obtain lighting device information when said sensor module is inserted or integrated into said lighting device, said lighting device information being indicative of a type of said lighting device,
     store said lighting device information in said memory,
     select, from said processing methods stored in said memory, a processing method in accordance with said type of said lighting device,
     obtain sensor data from said at least one sensor,
     apply said selected processing method to said sensor data to produce sensing results, and
     output said sensing results via said at least one output interface.

2. A sensor module as claimed in claim 1, wherein said type of said lighting device is indicative of a property of said lighting device which affects propagation of a signal received by said at least one sensor through said lighting device and/or through said lighting device's environment and said at least one processor is configured to select said processing method based on said property.

3. A sensor module as claimed in claim 1, wherein said type describes a surface on which said lighting device should be mounted or placed and/or comprises a model identifier and/or a model group identifier and said at least one processor is configured to select said processing method based on said surface, said model identifier and/or said model group identifier.

4. A sensor module as claimed in claim 1, wherein said at least one processor is configured to select a first processing method when said type of said lighting device, has a first value and a second processing method when said type of said lighting device has a second value.

5. A sensor module as claimed in claim 4, wherein said first processing method and said second processing method use different parameter values, and wherein said at least one processor is configured to apply said different parameter values to said sensor data.

6. A sensor module as claimed in claim 5, wherein said different parameter values comprise different threshold values, and wherein said at least one processor is configured to apply said different threshold values to said sensor data.

7. A sensor module as claimed in claim 4, wherein said first processing method and said second processing method use different algorithms.

8. A sensor module 4 as claimed in claim 4, wherein said first processing method and said second processing method use different parts of said sensor data, said different parts being obtained from different sensors.

9. A sensor module as claimed in claim 1, wherein said at least one sensor comprises a light sensor, a temperature sensor, an acoustic sensor, an infrared sensor, a motion sensor, accelerometer, gyroscope, magnetometer, and/or a microwave sensor.

10. A sensor module as claimed in claim 1, wherein said at least one processor is configured to obtain said lighting device information from said lighting device, from a user device or from a server.

11. A sensor module as claimed in claim 1, wherein said at least one processor is configured to obtain further sensor data from said at least one sensor in a learning phase, compare said further sensor data with reference data and determine said lighting device information based on said comparison.

12. A sensor module as claimed in claim 1, wherein said at least one processor is configured to receive further information and select said processing method further based on said further information, said further information comprising user input with regard to sensing requirements, information about said lighting device's environment and/or information about a space in which said lighting device has been installed.

13. A lighting device comprising the sensor module of claim 1.

14. A method of producing sensing results, said method comprising:
   obtaining lighting device information in a sensor module when said sensor module is inserted or integrated into a lighting device, said lighting device information being indicative of a type of said lighting device;
   storing said lighting device information in a memory of said sensor module, said memory storing processing methods associated with different types of lighting devices;
   selecting, from said processing methods stored in said memory, a processing method in accordance with said type of said lighting device;
   obtaining sensor data from at least one sensor comprised in said sensor module;
   applying said selected processing method to said sensor data to produce said sensing results; and
   outputting said sensing results.

15. A computer program or suite of computer programs comprising at least one software code portion or a computer program product storing at least one software code portion, the software code portion, when run on a computer system, being configured for performing the method of claim 14, the computer system comprising a memory, at least one sensor, at least one output interface and at least one processor.

* * * * *